(12) United States Patent
Shibata (10) Patent No.: US 12,361,113 B2
(45) Date of Patent: Jul. 15, 2025

(54) MEDIUM HANDLING APPARATUS

(71) Applicant: Glory Ltd., Himeji (JP)

(72) Inventor: Shinsuke Shibata, Himeji (JP)

(73) Assignee: GLORY LTD., Himeji (JP)

( * ) Notice: Subject to any disclaimer, the term of this patent is extended or adjusted under 35 U.S.C. 154(b) by 676 days.

(21) Appl. No.: 17/131,890

(22) Filed: Dec. 23, 2020

(65) Prior Publication Data

US 2021/0192038 A1     Jun. 24, 2021

(30) Foreign Application Priority Data

Dec. 23, 2019    (JP) ................... 2019-231488

(51) Int. Cl.
| | | |
|---|---|---|
| *G06F 21/00* | (2013.01) |
| *G06F 8/71* | (2018.01) |
| *G06F 9/4401* | (2018.01) |
| *G06F 21/44* | (2013.01) |
| *G07D 11/28* | (2019.01) |
| *G07D 11/40* | (2019.01) |
| *G07D 7/12* | (2016.01) |
| *G07D 11/125* | (2019.01) |
| *G07D 11/14* | (2019.01) |
| *G07D 11/237* | (2019.01) |
| *G07D 11/25* | (2019.01) |
| *G07D 11/50* | (2019.01) |

(Continued)

(52) U.S. Cl.
CPC ............... *G06F 21/44* (2013.01); *G06F 8/71* (2013.01); *G06F 9/4401* (2013.01); *G07D 11/28* (2019.01); *G07D 11/40* (2019.01); *G07D 7/12* (2013.01); *G07D 11/125* (2019.01); *G07D 11/14* (2019.01); *G07D 11/237* (2019.01); *G07D 11/25* (2019.01); *G07D 11/50* (2019.01); *G07D 11/60* (2019.01); *G07D 2207/00* (2013.01); *G07D 2211/00* (2013.01); *G07F 19/205* (2013.01); *G07F 19/206* (2013.01)

(58) Field of Classification Search
CPC ............ G07D 11/28; G06F 8/71; G06F 21/44
See application file for complete search history.

(56) References Cited

U.S. PATENT DOCUMENTS 8,307,675 B2 * 11/2012 Avganim ................ E05B 67/36
                                                              70/164
2006/0287958 A1 * 12/2006 Lundblade ............. G06F 21/51
                                                              705/57

(Continued)

*Primary Examiner* — Rodman Alexander Mahmoudi
(74) *Attorney, Agent, or Firm* — XSENSUS LLP (57) ABSTRACT

A medium handling apparatus includes a first memory device that is tamper resistant, a second memory device that stores a plurality of executable instructions, and a processor. The first memory device includes a first memory area that stores pieces of verification information, used for verification of validity of the plurality of executable instructions, as a list which enables a search for particular verification information by version of an executable instruction, and a second memory area that stores identification information for identifying a piece of verification information of an executable version of the executable instruction from the list. Each of the pieces of verification information includes an identifier of a version and a verification value calculated based on a valid executable instruction corresponding to the identifier.

8 Claims, 5 Drawing Sheets

(51) Int. Cl.
    *G07D 11/60*     (2019.01)
    *G07F 19/00*     (2006.01)

(56) References Cited

U.S. PATENT DOCUMENTS

| | | | |
|---|---|---|---|
| 2012/0137126 A1* | 5/2012 | Matsuoka | H04L 9/0838 |
| | | | 713/156 |
| 2013/0036467 A1 | 2/2013 | Krummel et al. | |
| 2013/0200606 A1* | 8/2013 | Omar | B42D 15/00 |
| | | | 283/74 |
| 2016/0203313 A1* | 7/2016 | El-Moussa | G06F 21/57 |
| | | | 726/23 |
| 2019/0080080 A1* | 3/2019 | Ogura | G06F 21/572 |
| 2021/0192014 A1* | 6/2021 | Yamaguchi | G06F 21/44 |
| 2022/0335402 A1* | 10/2022 | Deaville | G07F 19/202 |

\* cited by examiner

MEDIUM HANDLING APPARATUS

CROSS-REFERENCE TO RELATED APPLICATION

This application claims priority to Japanese Patent Application No. 2019-231488, filed on Dec. 23, 2019, the entire disclosure of which is incorporated herein by reference.

BACKGROUND

Conventionally, a sheet handling apparatus uses a checksum to check the consistency of software. Validity of software can be assumed by users. However, often software has a plurality of versions, which require a mechanism that securely manages information (such as a checksum) that identifies an executable version of the software.

SUMMARY

A first aspect of the present disclosure relates to a medium handling apparatus that includes a first memory device that is tamper resistant, a second memory device that stores a plurality of executable instructions, and a processor. The first memory device includes a first memory area that stores pieces of verification information, used for verification of validity of the plurality of executable instructions, as a list which enables a search for particular verification information by version of an executable instruction, and a second memory area that stores identification information for identifying a piece of verification information of an executable version of the executable instruction from the list. Each of the pieces of verification information includes an identifier of a version and a verification value calculated based on a valid executable instruction corresponding to the identifier.

DETAILED DESCRIPTION OF THE DRAWINGS

Figure 1:
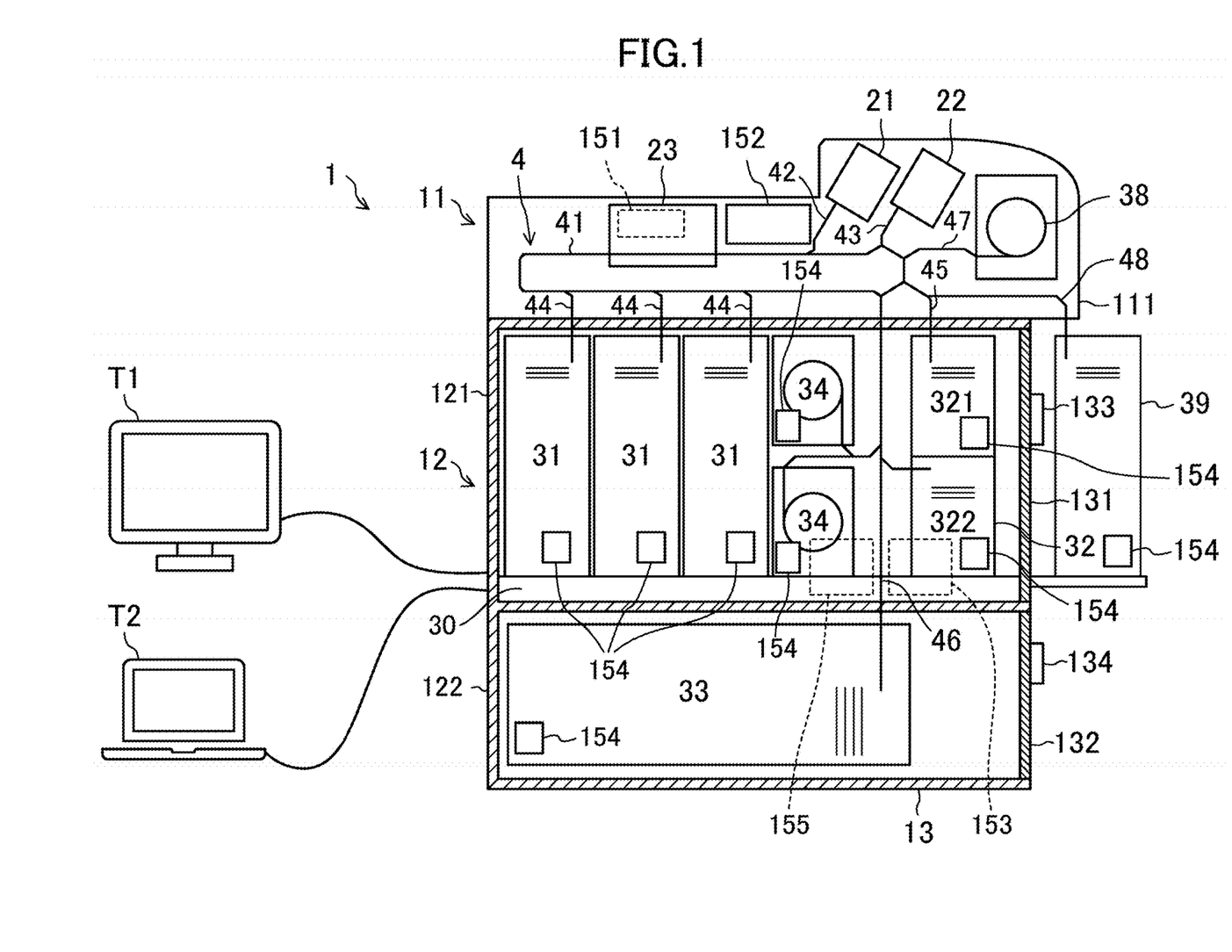
FIG. 1 illustrates an internal configuration of a banknote handling apparatus.

Embodiments of a medium handling apparatus will be described below with reference to the drawings. The medium handling apparatus described below is a device that handles mediums which may be valuable, such as banknotes, cash, and other types of currency or documents. FIG. 1 shows a banknote handling apparatus 1 as an example of the medium handling apparatus. The banknote handling apparatus 1 is installed in, for example, a financial institution such as a bank. The banknote handling apparatus 1 can also be installed in, for example, a back office of a retail store. The banknote handling apparatus 1 performs processes related to banknotes.

First Embodiment

General Configuration of Banknote Handling Apparatus

FIG. 1 illustrates an internal configuration of the banknote handling apparatus 1. In the following description, in FIG. 1, a side of the apparatus with a first door 131 to be described later may be referred to as a "front side." and a side opposite to the side with the first door 131 may be referred to as a "rear side."

The banknote handling apparatus 1 handles loose banknotes. The banknote handling apparatus 1 includes an upper handling unit 11 and a lower safe unit 12. The safe unit 12 includes a first safe unit 121 and a second safe unit 122.

The handling unit 11 includes an upper housing 111. In the upper housing 111, a depositing unit 21, a dispensing unit 22, a recognition unit 23, and part of a transport path are disposed.

The safe unit 12 has a safe housing 13. The inside of the safe housing 13 is divided into two. Storage units and part of the transport path are disposed in the safe housing 13. The safe housing 13 protects the storage units at a security level equal to or higher than a predetermined level. The security level of the safe housing 13 is higher than that of the upper housing 111.

The safe housing 13 has a first door 131 and a second door 132. The first door 131 is provided with an electronic lock 133. Unlocking the electronic lock 133 by the user opens the first door 131. Optionally, the user can draw the storage units in the first safe unit 121 forward of the banknote handling apparatus 1 when the first door 131 opens.

The user can draw storage units 31, 32, and 34, which will be described later, forward of the banknote handling apparatus 1 with these storage units being supported by a support 30. The user can remove the drawn storage units 31, 32, and 34 from the support 30.

The second door 132 is also provided with an electronic lock 134. Unlocking the electronic lock 134 by a user opens the second door 132. Optionally, the user can draw the storage unit in the second safe unit 122 forward of the banknote handling apparatus 1 when the second door 132 opens.

A person allowed to unlock the electronic lock 133 has a special authority. A person allowed to unlock the electronic lock 134 also has a special authority. The person allowed to unlock the electronic lock 133 and the person allowed to unlock the electronic lock 134 are not necessarily the same.

The depositing unit 21 is a portion of the apparatus into which the banknotes to be deposited are placed, for example, in a depositing process. The user manually places the banknotes in the depositing unit 21. The depositing unit 21 maintains a plurality of banknotes being stacked. The depositing unit 21 has a mechanism of taking the banknotes one by one into the apparatus.

The dispensing unit 22 is a portion of the apparatus which maintains the dispensed banknotes, for example, in a dispensing process. The dispensing unit 22 can be used for various applications. The dispensing unit 22 maintains a plurality of banknotes being stacked. The user can manually remove the banknotes from the dispensing unit 22.

The recognition unit 23 is provided at a loop transport path 41, which will be described later. The recognition unit 23 detects banknotes transported along the loop transport path 41. In some implementations, the recognition unit 23 is an imaging device, such as a camera or image sensor. The recognition unit 23 acquires an image of each of the detected banknotes. The recognition unit 23 recognizes at least whether each of the banknotes is genuine or not, a denomination of each of the banknotes, and whether each of the banknotes is fit or unfit. The recognition unit 23 acquires a serial number of each of the banknotes.

The recognition unit 23 also recognizes transport anomaly of the banknotes. The "transport anomaly" means that the banknotes are not transported in a predetermined normal state. An example of the transport anomaly is a situation in which the banknotes are skewed at a larger angle than a predetermined allowable angle with respect to the transport direction of the banknotes. Another example of the transport anomaly is a situation in which the banknotes are continuously transported at smaller intervals than allowable intervals.

Seven storage units are provided in total (i.e., the storage units 31, 32, 33, and 34). Each of the storage units 31 has a vertically elongated box shape. Each of the storage units 31 stores the banknotes being stacked vertically. The storage units 31 are storage cassettes detachable from the banknote handling apparatus 1. Each of the storage units 31 can feed the banknotes stored in the storage unit. The storage units 31 are arranged side by side in the front-rear direction at a rear position in the first safe unit 121. The storage units 31 store the banknotes sorted by denomination, for example.

The storage unit 32 also has a vertically elongated box shape. The storage unit 32 also stores the banknotes being stacked vertically. The storage unit 32 is arranged at a front position in the first safe unit 121. The inside of the storage unit 32 is divided into two. i.e., an upper storage unit 321 and a lower storage unit 322. The upper storage unit 321 and the lower storage unit 322 are arranged vertically.

The storage unit 33 stores the banknotes being arranged horizontally side by side. The storage unit 33 cannot feed the banknotes stored therein. The storage unit 33 is arranged in the second safe unit 122. The user can remove the storage unit 33 from the second safe unit 122. The storage unit 33 can be used as, for example, a collection cassette. In the following description, the storage unit 33 may also be referred to as a collection cassette 33.

Each of the storage units 34 stores the banknotes being wrapped around a drum together with a tape. The storage units 34 are box-shaped. The storage units 34 are detachable from the banknote handling apparatus 1. The storage units 34 can feed the banknotes stored therein. The storage units 34 are arranged to vertically overlap with each other at a center position in the first safe unit 121.

Optionally, a sensor which detects the passage of the banknotes is provided for an inlet and outlet of each of the storage units 31, 32, 33, and 34. A controller 15, which will be described later, counts the number of banknotes entering each of the storage units and the number of banknotes coming out of each of the storage units based on a detection signal from the sensor. The controller 15 manages the number of banknotes stored in the storage units based on the counted number of banknotes.

The transport unit 4 transports the banknotes in the banknote handling apparatus 1. The transport unit 4 has a transport path. Optionally, the transport path is comprised of a combination of a plurality of rollers, a plurality of belts, a motor for driving the rollers and the belts, and a plurality of guides. The transport unit 4 transports the banknotes one by one at intervals along the transport path, for example, with a long edge of each of the banknotes facing forward. The transport unit 4 may transport the banknotes with a short edge of each of the banknotes facing forward.

The transport unit 4 has a loop transport path 41. The loop transport path 41 is provided in the upper housing 111. The transport unit 4 transports the banknotes along the loop transport path 41 clockwise or anticlockwise in FIG. 1.

The depositing unit 21 is connected to the loop transport path 41 via a connection path 42. The dispensing unit 22 is connected to the loop transport path 41 via a connection path 43.

Each of the storage units 31 is connected to the loop transport path 41 via a connection path 44. The three connection paths 44 extend vertically across the handling unit 11 and the first safe unit 121. The transport unit 4 transports the banknotes from the loop transport path 41 to each of the storage units 31. The transport unit 4 transports the banknotes from each of the storage units 31 to the loop transport path 41.

The upper storage unit 321 of the storage unit 32 is connected to the loop transport path 41 via a connection path 45. The transport unit 4 transports the banknotes from the loop transport path 41 to the upper storage unit 321. The transport unit 4 transports the banknotes from the upper storage unit 321 to the loop transport path 41.

The lower storage unit 322 is connected to the loop transport path 41 via a connection path 46. The connection path 46 has branches. The lower storage unit 322 is connected to one of the branches. The transport unit 4 transports the banknotes from the loop transport path 41 to the lower storage unit 322. The transport unit 4 transports the banknotes from the lower storage unit 322 to the loop transport path 41. The connection path 46 extends vertically across the handling unit 11, the first safe unit 121, and the second safe unit 122.

Each of the storage units 34 is connected to the loop transport path 41 via the connection path 46. The storage units 34 are connected to the respective branches of the connection path 46. The transport unit 4 transports the banknotes from the loop transport path 41 to each of the storage units 34. The transport unit 4 transports the banknotes from each of the storage units 34 to the loop transport path 41. The collection cassette 33 is connected to the loop transport path 41 via the connection path 46.

A tracking sensor 49 (see FIG. 2) which detects the passage of the banknotes is provided for each of the loop transport path 41 and the connection paths 42, 43, 44, 45, and 46. The transport unit 4 receives a command related to the transport of the banknotes from the controller 15, which will be described later. The transport unit 4 transports the banknotes to a predetermined destination in accordance with the command. In this case, the transport unit 4 controls each branching mechanism based on the detection signal of the tracking sensor 49.

The banknote handling apparatus 1 has a temporary storage unit 38 in the upper housing 111. The temporary storage unit 38 temporarily stores the banknotes to be deposited, for example, in the depositing process. The temporary storage unit 38 can be used for various applications. The temporary storage unit 38 is arranged at a front position in the upper housing 111. The temporary storage unit 38 is connected to the loop transport path 41 via a connection path 47.

As shown in FIG. 1, an external storage unit 39 can be attached to the banknote handling apparatus 1. The external storage unit 39 can be detached from the banknote handling apparatus 1. The external storage unit 39 is a detachable storage unit. The external storage unit 39 is connected to the loop transport path 41 via a connection path 48.

The banknote handling apparatus 1 includes a user interface (hereinafter referred to as a "UI unit 16"). The UI unit 16 is provided with an operator (such as a key and a touch panel). Devices such as a card reader and a printer may be connected to the UI unit 16. The UI unit 16 includes an output unit that outputs various kinds of sound. The sound referred to herein includes voice. The user can give various instructions to the banknote handling apparatus 1 by operating the operator.

Figure 2:
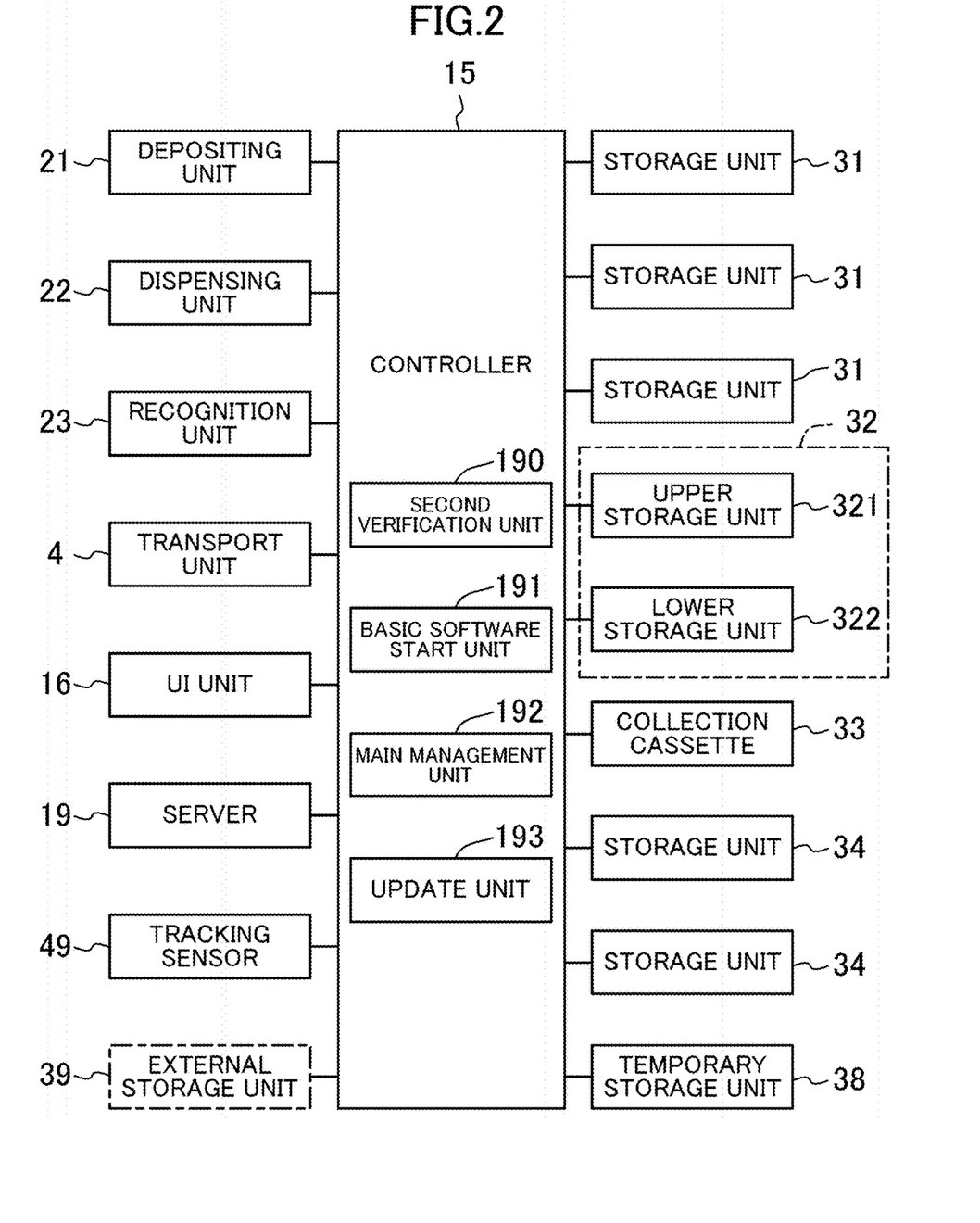
FIG. 2 is a block diagram illustrating a configuration of a controller.

The banknote handling apparatus 1 includes a controller 15. FIG. 2 is a block diagram illustrating the configuration of the controller 15. The controller 15 is connected to the depositing unit 21, the dispensing unit 22, the recognition unit 23, the transport unit 4, the storage units 31, 32, 33, and 34, and the temporary storage unit 38 so as to be able to transmit and receive signals to and from these units. When the external storage unit 39 is attached to the banknote handling apparatus 1, the external storage unit 39 is also connected to the controller 15 to be able to transmit and receive a signal to and from the controller 15.

For example, in response to a user's instruction to execute a process through the UI unit 16, the controller 15 outputs signals to the depositing unit 21, the dispensing unit 22, the recognition unit 23, the transport unit 4, the storage units 31, 32, 33, and 34, the temporary storage unit 38, and the external storage unit 39 so that these units execute the process corresponding to the instruction. The controller 15 will be described in detail below.

Hardware Configuration of Controller

Figure 3:
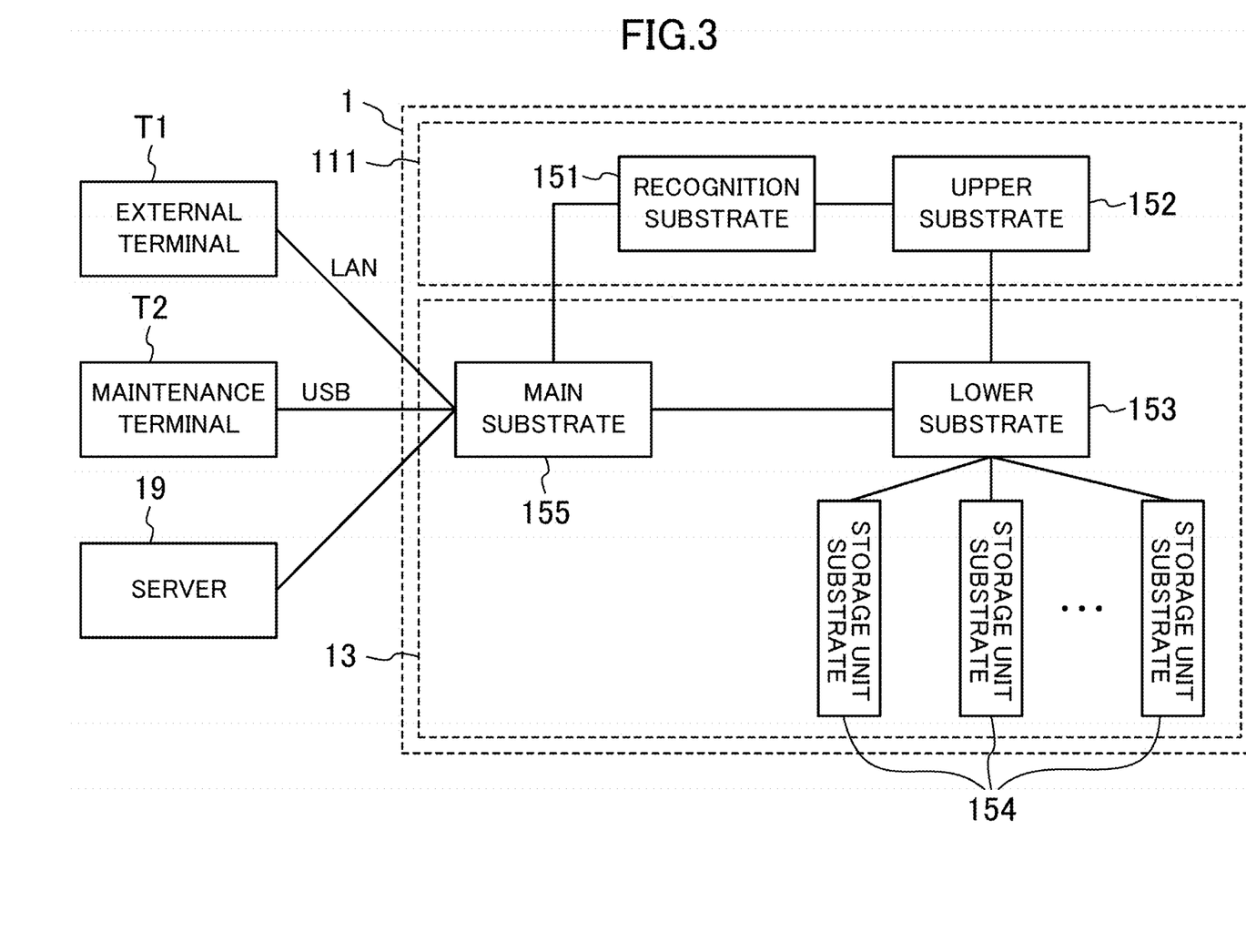
FIG. 3 illustrates substrates of the banknote handling apparatus.

The controller 15 is realized by executable instructions of software and specialized hardware. In particular, controller 15 is implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. In the banknote handling apparatus 1, these processors are separately installed on five kinds of substrates. FIG. 3 illustrates the substrates of the banknote handling apparatus 1.

As shown in FIG. 3, the banknote handling apparatus 1 includes a recognition substrate 151, an upper substrate 152, a lower substrate 153, storage unit substrates 154, and a main substrate 155. The recognition substrate 151 and the upper substrate 152 are provided in the upper housing 111.

The lower substrate 153, the storage unit substrates 154, and the main substrate 155 are provided in the safe housing 13. More specifically, the lower substrate 153 and the main substrate 155 are provided in the first safe unit 121. That is, the main substrate 155 is installed in a place where access to the main substrate 155 requires unlocking of the electronic lock 133. The storage unit substrates 154 are respectively provided for the storage units 31, 32, 33, and 34.

Each of the substrates includes a memory device, a microcomputer (processor) and/or processing circuitry programmed to perform functionality described below, and a communication interface. The memory device is constituted of a semiconductor memory such as a RAM, a ROM, an eMMC, and an SSD. The term eMMC is an abbreviation for embedded Multi Media Card. The term SSD is an abbreviation for Solid State Drive. The memory device stores various kinds of data and software. The processor/processing circuitry executes the various kinds of software in the memory device.

The communication interface is configured to enable communication based on a predetermined communication standard such as USB and RS-422. The communication interface is used for communication between the substrates. Depending on the substrate, the communication interface is also connected to the Internet. Depending on the substrate, the communication interface may be connected to a local area network (LAN). Depending on the substrate, the communication interface may be a network interface, such as a LAN.

In the banknote handling apparatus 1, the main substrate 155 exerts a security management function (to be described later) in the banknote handling apparatus 1. The main substrate 155 has a characteristic hardware configuration in order to realize the security management function.

Hardware Configuration of Main Substrate 155

Figure 4:
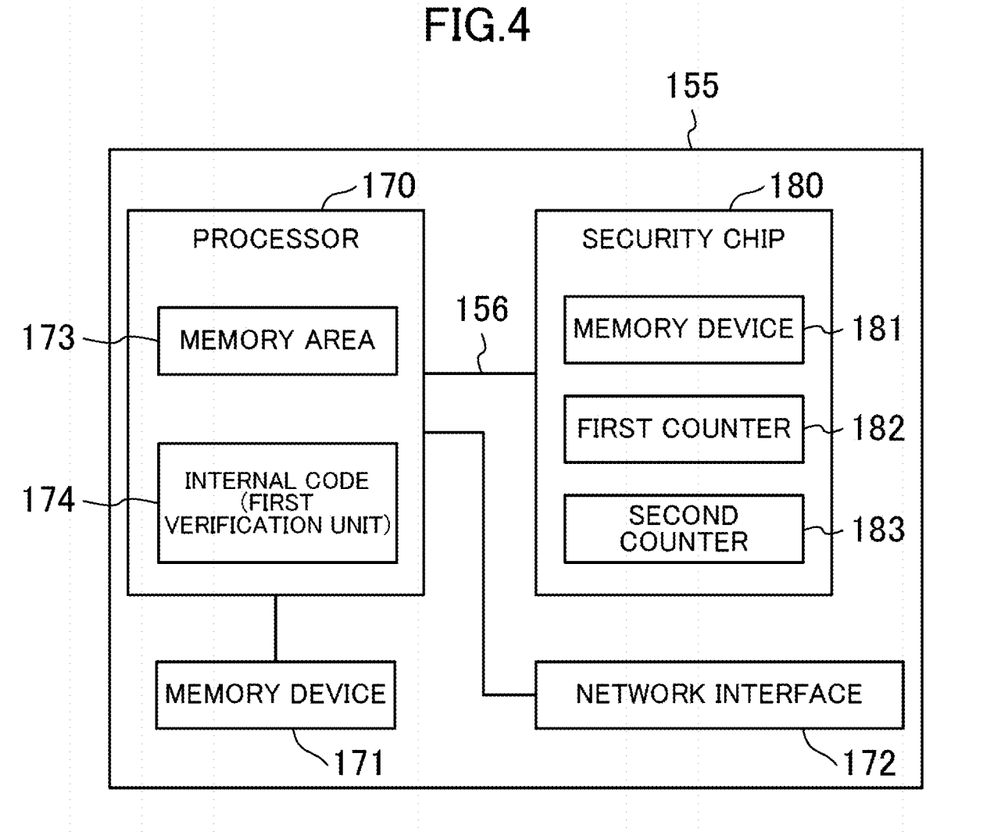
FIG. 4 schematically illustrates a hardware configuration of a main substrate.

FIG. 4 is a block diagram schematically illustrating the hardware configuration of the main substrate 155. The main substrate 155 includes a processor 170, a memory device 171, a communication interface 172, and a security chip 180.

The processor 170 executes the software in the memory device 171 just like the processors (microcomputers) of the other substrates. A code that can be executed by the processor 170 itself (hereinafter referred to as an "internal code") is embedded in the processor 170. The processor 170 is configured to be unable to change the internal code. In other words, a third party cannot falsify the internal code. The processor 170 executes the internal code at the activation of the processor 170.

The processor 170 is provided with a memory area 173 that holds predetermined information (digital data). The memory area 173 is configured to be unable to alter the data once written therein. The information in the memory area 173 cannot be falsified.

Information is written in the memory area 173 by a manufacturer of the banknote handling apparatus 1 before shipping the banknote handling apparatus 1 (e.g., at the manufacture of the banknote handling apparatus 1). The information written in the memory area 173 and how the information is used will be described later.

The security chip 180 is a semiconductor device having tamper resistance. The "tamper resistance" refers to a characteristic which makes analysis, reading, and falsification of the data recorded in the chip difficult. A security chip (TPM) that confirms to the security specifications defined by TCG can be used as the security chip 180. The term TCG is an abbreviation for Trusted Computing Group. The term TPM is an abbreviation for Trusted Platform Module.

The security chip 180 is connected to the processor 170 by a bus 156. Access to the security chip 180 (writing or reading data) from the processor 170 requires an authentication code AV, which will be described later.

The security chip 180 includes a memory device 181 (a first memory device), a first counter 182, and a second counter 183. The first counter 182 and the second counter 183 are so-called monotonic counters.

The first counter 182 is configured to increase the count value by one for each predetermined event in the security chip 180. The "predetermined event" refers to turning a power supply on, access to the data in the security chip 180, and access to the first counter 182, for example. In response to the application of a reset signal to a predetermined terminal of the security chip 180, the value of the first counter 182 is reset.

Similarly to the first counter 182, the second counter 183 is also configured to increase the count value by one for each predetermined event in the security chip 180. In the present disclosure, the count value of the second counter 183 also increases with the increase in the count value of the first counter 182. The security chip 180 cannot reset the second counter 183 even when the reset signal is applied to the predetermined terminal.

The initial values of the first and second counters 182 and 183 (one in this case) are set by the manufacturer of the banknote handling apparatus 1 before shipping the banknote handling apparatus 1 (e.g., at the manufacture). At the shipping of the banknote handling apparatus 1, the values of the first and second counters 182 and 183 are the same.

The security chip 180 also has the function of storing a plurality of encryption keys. The security chip 180 also has the function of calculating a hash value.

The memory device 171 (hereinafter also referred to as a "second memory device") is configured in the same manner as the memory devices of the other substrates. The memory device 171 may be comprised of a plurality of kinds of devices (e.g., an eMMC and a ROM). In the present embodiment, the memory device 171 of the main substrate 155 includes an eMMC. The communication interface 172 is configured in the same manner as the communication interfaces of the other substrates.

Functional Configuration of Controller

In the banknote handling apparatus 1, the processors of the respective substrates execute various kinds of software to realize various functions of the controller 15.

The recognition substrate 151 controls the recognition unit 23 and outputs the recognition result, upon execution of a predetermined piece of software by the processor thereof. For example, the recognition substrate 151 recognizes, based on the image of the banknote, whether the banknote is genuine or not, a denomination of the banknote, and whether the banknote is fit or unfit. The recognition substrate 151 is connected to the upper substrate 152 via the communication interface. The recognition substrate 151 outputs the recognition result to the upper substrate 152 via the communication interface.

The upper substrate 152 controls the operations of the depositing unit 21, the dispensing unit 22, the temporary storage unit 38, the transport unit 4, and the tracking sensors 49 upon execution of a predetermined piece of software by the processor thereof. For example, the upper substrate 152 controls components of the transport unit 4 such as a drive mechanism (motor). The upper substrate 152 controls the UI unit 16. The upper substrate 152 receives an instruction from the user via the UI unit 16.

The storage unit substrate 154 is provided for each of the storage units 31, 32, 33, and 34. The memory device of each storage unit substrate 154 stores an ID and door open/close log of a corresponding one of the storage units 31, 32, 33, and 34. These memory devices may sometimes store at least one of the kind or number of the banknotes stored therein.

The storage unit substrates 154 are connected to the lower substrate 153 via the communication interface. In response to a request from the lower substrate 153, the storage unit substrates 154 transmit information about the ID and the door open/close log to the lower substrate 153 via the communication interface.

The lower substrate 153 controls the storage units 31, 32, 33, and 34, the transport unit 4, and the tracking sensor 49 upon execution of a predetermined piece of software by the processor thereof. The lower substrate 153 collects the IDs and log data of the storage units 31, 32, 33, and 34.

The lower substrate 153 is connected to the upper substrate 152 via the communication interface. When controlling the transport unit 4, the lower substrate 153 transmits a predetermined signal (command) to the upper substrate 152 via the communication interface.

The main substrate 155 takes charge of activation of the banknote handling apparatus 1, communication between the banknote handling apparatus 1 and the outside, and management of various kinds of software, upon execution of a predetermined piece of software by the processor thereof. The memory device 171 of the main substrate 155 is equipped with basic software (so-called OS). The basic software can be, for example. Linux (registered trademark). Of course, the basic software is not limited to Linux (registered trademark).

The main substrate 155 is connected to the lower substrate 153 via the communication interface 172. Transmission and reception of the log data and update files are performed between the main substrate 155 and the lower substrate 153.

The main substrate 155 is connected to the recognition substrate 151 via the communication interface 172. The main substrate 155 transmits recognition data to the recognition substrate 151, and receives banknote image data from the recognition substrate 151. The recognition data is data used to recognize whether the banknote is genuine or not, a denomination of the banknote, and whether the banknote is fit or unfit. The banknote image data is image data of the banknote acquired by the recognition substrate 151.

The communication interface 172 of the main substrate 155 is connected to the LAN. The main substrate 155 communicates with an external terminal T1 via the LAN. The main substrate 155 receives, for example, a command to deposit or dispense the banknotes, from the external terminal T1.

The communication interface 172 of the main substrate 155 is connected to a server 19 via the Internet. The server 19 is managed by, for example, the manufacturer of the banknote handling apparatus 1. The server 19 notifies the main substrate 155 of the update of the various kinds of software as necessary. When updating the software, the server 19 distributes an update file (to be described later) of a new version of the software to the banknote handling apparatus 1.

The main substrate 155 may be connected to a maintenance computer (hereinafter also referred to as a "maintenance terminal T2") via the communication interface 172. The main substrate 155 transmits the log data to, and receives the update file from, the maintenance terminal T2.

Security Management Function

The banknote handling apparatus 1 ensures security (security management) when starting and updating the software. The security management requires various pieces of information such as an encryption key (hereinafter referred to as "security management information"). The banknote handling apparatus 1 stores various pieces of security management information.

Security Management Information

The banknote handling apparatus 1 stores the pieces of security management information in the processor 170, the security chip 180, and the memory device 171.

Security Management Information in Processor 170

The memory area 173 of the processor 170 stores a verification value (hash value) of a first key K. The first key K is an encryption key used to verify an electronic signature of a first loader L1, which will be described later. In the present embodiment, the first key K is a public key of the RSA cryptosystem (2048 bit). The verification value of the first key K1 is written in the memory area 173 by the manufacturer of the banknote handling apparatus 1 before shipping the banknote handling apparatus 1 (e.g., at the manufacture of the banknote handling apparatus 1).

Security Management Information in Security Chip 180

Figure 5:
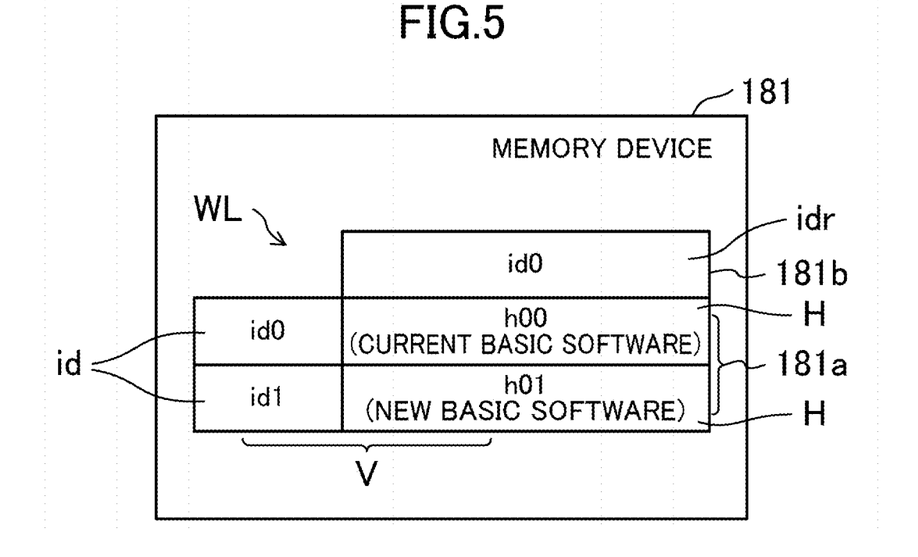
FIG. 5 schematically illustrates sections of a memory device used.

The security chip 180 stores the security management information in the memory device 181. FIG. 5 schematically illustrates sections of the memory device 181 used. The memory device 181 includes a memory area 181a and a memory area 181b as the sections used.

The memory area 181a is an area that stores a so-called white list WL. The white list WL according to the present disclosure is a list which is configured to enable a search for a piece of verification information V used to verify the validity of a piece of software by version of the software.

In the memory area 181a, a white list WL of the first loader L1, which will be described later, and a white list WL of the basic software are written by the manufacturer of the banknote handling apparatus 1 as initial values. In the memory area 181a, a white list WL of application software (to be described later) is also written by the manufacturer of the banknote handling apparatus 1. Further, a white list WL of a different piece of software may be written in the memory area 181a by the manufacturer of the banknote handling apparatus 1.

The verification information V is constituted of a pair of an identifier id of a version and a verification value H. The identifier id is an identifier capable of identifying, from the group consisting of a verification value H of a certain piece of software and a verification value H of one or more pieces of software that has updated the certain piece of software, a verification value H of a single piece of software. The identifier id of the present embodiment is a so-called version number. The verification value H is a hash value calculated based on a valid piece of software corresponding to the counterpart identifier id.

The memory area 181b is an area that stores identification information idr. The identification information idr is information for identifying the verification value H of an executable version of the software from the white list WL. Specifically, the identification information idr is an identifier id of the verification value H of the software which is permitted to be executed. A single identifier idr is provided for the group consisting of a verification value H of a certain piece of software and a verification value H of one or more pieces of software that has updated the certain piece of software. Further, the identification information idr may be a flag that is given to each of the verification values H of the pieces of software in the white list WL and indicates whether the software is executable or not.

FIG. 5 illustrates the white list WL related to the basic software. In the example of FIG. 5, the verification information V of a current version of the basic software includes id0 as the identifier id, and h00 as the verification value H.

The white list WL shown in FIG. 5 also includes verification information V of a new version of the basic software. The verification information V of the new version of the basic software includes id1 as the identifier id, and h01 as the verification value H. As the identification information idr, id0 is determined. That is, the current version of the basic software is allowed to be executed.

As described above, the security chip 180 has the function of storing a key used to decrypt the encrypted data. The security chip 180 stores a second key K2, which will be described later. The second key K2 is a public key of the RSA cryptosystem (2048 bit). The security chip 180 stores a third key K3, which will be described later. The third key K3 is a key of the AES cryptosystem (128 bit).

Security Management Information in Memory Device 171

The memory device 171 stores the first key K1. The memory device 171 stores an encrypted authentication code AV required to access the security chip 180. The memory device 171 that stores the first key K1 and the authentication code AV is a device physically different from the memory device 171 that loads the software (e.g., application software to be described later). Only the processor 170 is allowed to decrypt the authentication code AV.

Security Management Operation

In the banknote handling apparatus 1, the processor 170 runs to ensure security when booting and updating the software using the security management information.

Security Management at Boot of Basic Software

In response to the activation of the banknote handling apparatus 1, the processor 170 boots the basic software. The term "boot" is to put the software into a usable state. Upon booting the basic software, the processor 170 verifies software used for booting (hereinafter referred to as a "boot loader") and the basic software.

The processor 170 functions as a first verification unit 174 by executing the internal code. Since the internal code of the processor 170 cannot be falsified, the operation of the processor 170 as the first verification unit 174 causes no security problem. The first verification unit 174 performs the following procedures (1) to (3).

(1) Verification of First Key K1

The first verification unit 174 performs the verification of the first key K1. A hash value held in the memory area 173 of the processor 170 is used for the verification. The memory area 173 is a non-rewritable memory area. Thus, the hash value of the memory area 173 is reliable. If the verification founds that the first key K1 is inappropriate, the first verification unit 174 ends the booting of the basic software. This blocks the use of an unauthorized encryption key.

(2) Verification of Validity of First Loader L1

If the first key K1 is a valid key, the first verification unit 174 verifies the validity of the first loader L1. The first loader L1 is software for performing the verification of the security chip 180, the verification of a second loader L2, and the activation of the second loader L2. The first loader L1 is stored in the memory device 171. An electronic signature is attached to the first loader L1 using a private key corresponding to the first key K1. The private key is managed by the manufacturer of the banknote handling apparatus 1 in secret.

The first verification unit 174 verifies the electronic signature of the first loader L1 using the first key K1. If the electronic signature of the first loader L1 is inappropriate, the first verification unit 174 ends the booting. This end of the booting blocks the use of an unauthorized boot loader.

(3) Decryption of Authentication Code AV

If the electronic signature of the first loader L1 is appropriate, the first verification unit 174 decrypts the authentication code AV in the memory device 171. This decryption enables access to the security chip 180 from the processor 170. The processor 170 ends the operation as the first verification unit 174, and executes the first loader L1.

The processor 170 executes the first loader L1 to function as a second verification unit 190. The second verification unit 190 performs the verification and activation of the second loader L2. The second verification unit 190 performs the following procedures (4) and (5).

(4) Verification of Validity of Security Chip 180

The second verification unit 190 verifies the validity of the security chip 180. An authentication code AV is required to access the security chip 180. Thus, it is generally difficult for a third party to rewrite data in the security chip 180. However, it is technically possible to apply a reset signal to the terminal of the security chip 180 to write new data therein. Therefore, the banknote handling apparatus 1 verifies the validity of the security chip 180 at booting of the basic software.

The second verification unit 190 verifies the validity of the security chip 180 using the first and second counters 182 and 183. The verification of the validity of the security chip 180 proceeds as follows.

The first counter 182 counts up the value by one for each predetermined event. Similarly to the first counter 182, the second counter 183 also counts up the value by one for each predetermined event. If the security chip 180 is valid, the count value of the first counter 182 and the count value of the second counter 183 are equal to each other.

Suppose that the security chip 180 is reset to falsify the data in the security chip 180. In response to the reset of the security chip 180, the first counter 182 is also reset. In response to an initial access to the security chip 180 after the reset, the value of the first counter 182 becomes one.

The second counter 183 is configured not to be reset even when the security chip 180 is reset. In response to the access to the second counter 183 after the reset of the security chip 180, the previous value is counted up. Then, a difference is made between the count value of the first counter 182 and the count value of the second counter 183.

If the count values are different from each other in this way, it can be determined that the security chip 180 has a security problem. If the validity verification of the security chip 180 founds a security problem in the security chip 180, the second verification unit 190 stops the booting of the basic software.

(5) Verification of Second Loader L2

If the security chip 180 has no security problem, the second verification unit 190 performs the verification of the second loader L2. The second loader L2 is software for booting the basic software.

The second verification unit 190 verifies the second loader L2 using the white list WL. First, the second verification unit 190 obtains a verification value (hereinafter referred to as a "value to be verified") of the second loader L2 that is scheduled to be loaded. The value to be verified is a hash value of the second loader L2 scheduled to be loaded. The hash value can be obtained using the function of the security chip 180.

The second verification unit 190 acquires a verification value (hereinafter referred to as a "validity verification value") of the second loader L2 that is allowed to be executed. The validity verification value of the second loader L2 can be acquired from the white list WL. Specifically, the second verification unit 190 accesses the security chip 180, and reads the identification information idr from the memory device 181. The second verification unit 190 reads a verification value H corresponding to the same identifier id as the identification information idr from the white list WL.

The second verification unit 190 compares the value to be verified with the validity verification value. If the value to be verified and the validity verification value do not match, the second verification unit 190 stops the booting of the basic software. If the value to be verified and the validity verification value match each other, the second verification unit 190 activates the second loader L2. The processor 170 ends the operation as the first loader L1.

Executing the second loader L2, the processor 170 functions as a basic software start unit 191. The basic software start unit 191 performs the procedure (6) described below.

(6) Verification of Basic Software

The basic software start unit 191 verifies the basic software using the white list WL. The verification of the basic software using the white list WL proceeds in the same manner as the verification of the second loader L2 by the second verification unit 190.

If the verification founds that the basic software is invalid, the basic software start unit 191 stops the starting process of the basic software. If the basic software is valid, the basic software start unit 191 starts the basic software. The processor 170 ends the operation as the basic software start unit 191. The processor 170 executes the basic software.

Executing the basic software, the processor 170 functions as a main management unit 192. The main management unit 192 performs various initial settings.

The main management unit 192 verifies the validity of the file system using the white list WL at the initial setting of the basic software. The verification using the white list WL proceeds in the same manner as the verification of the second loader L2 by the second verification unit 190. If the file system is invalid, the main management unit 192 stops the operation. If the file system is valid, the main management unit 192 mounts the file system.

If pieces of software (hereinafter referred to as "pieces of application software") are required to exhibit the function as the controller 15, the main management unit 192 starts them. Specifically, the main management unit 192 starts the pieces of application software for handling the medium (banknotes in this example).

The main management unit 192 also performs the verification of the pieces of application software using the white list WL. If the verification founds that the pieces of application software are valid, the processor 170 executes them. If an invalid piece of application software is found, the application software is not started. The processor 170 notifies the user of the presence of the invalid piece of application software via the UI unit 16. The processor 170 waits for an instruction from the user.

When the pieces of application software are all valid, the processor 170 ends the operation as the main management unit 192. Executing the pieces of application software, the processor 170 functions as the controller 15 which the main substrate 155 takes charge of.

As described above, in the banknote handling apparatus 1, the first loader L1 is verified using the internal code that can guarantee the validity. If the first loader L1 is valid, the pieces of software (the second loader L2 and the basic software) which are guaranteed to be valid by the white list WL are sequentially started. Through this starting procedure, the banknote handling apparatus 1 can ensure the security at the time of the starting.

Security Management at Software Update

The banknote handling apparatus 1 may receive a notification of a software update from the server 19. The banknote handling apparatus 1 may also be instructed to update the software via the maintenance terminal T2. For example, upon receipt of the notification of the software update from the server 19 or the maintenance terminal T2 by the banknote handling apparatus 1, the processor 170 executes an update application.

The update application is software (management software) that updates the current version of software to a new version of the software. The update application is stored in the memory device 171. The update application is software registered in the white list WL. In other words, the update application is software with ensured security.

Executing the update application, the processor 170 functions as an update unit 193. The update unit 193 performs the following procedures (1) to (4). If access to the security chip 180 is required to perform these procedures, the update unit 193 uses the authentication code AV.

(1) Verification of Electronic Signature of Update File

An update file is an electronic file that stores a new version of software. The software stored in the update file is encrypted. An electronic signature is attached to the update file using a private key corresponding to the second key K2. The private key is managed by the manufacturer of the banknote handling apparatus 1 in secret.

The update unit 193 acquires the second key K2 from the security chip 180. The update unit 193 performs verification of the electronic signature of the update file using the second key K2. If the electronic signature of the update file is inappropriate, the update unit 193 stops the update of the software. This stop of the update blocks an install of unauthorized software.

(2) Decryption of Update File

If the electronic signature of the update file is appropriate, the update unit 193 decrypts the update file. The update unit 193 uses the third key K3 to decrypt the update file. The update unit 193 acquires the third key K3 from the security chip 180. If the new version of the software is compressed, the update unit 193 decompresses it.

(3) Placement of Update File in Memory Device 171

The update unit 193 loads (places) the new version of the software in the memory device 171. In this case, the update unit 193 selects, as an area in the memory device 171 to be loaded with the new version of the software, an area different from the area where the current version of the software is loaded. In other words, the current version of the software is not overwritten by the new version of the software.

(4) Update of White List WL

The update unit 193 registers the new version of the software in the white list WL. First, the update unit 193 obtains a hash value (a verification value H) of the new version of the software. The hash value can be obtained using the function of the security chip 180.

The update unit 193 adds the obtained hash value and an identifier id of the new version as the verification information V to the white list WL. Further, the update unit 193 writes the identifier id of the new version as the identification information idr in the memory area 181*b*. If the identification information idr is rewritten to the identifier id of the new version, the new version of the software is started at the next start of the software. Thus, the update of the software is completed.

As can be seen in the foregoing, the present disclosure is directed to the banknote handling apparatus 1 that handles a medium, and includes the first memory device (memory device 181) having the tamper resistance, the second memory device (memory device 171) that stores pieces of software of a plurality of kinds, and the processor 170 that executes the pieces of software. The first memory device is provided with: the memory area 181*a* that stores pieces of verification information V used for verification of the validity of the pieces of software as a list which enables a search for the verification information V by version of the software; and the memory area 181*b* that stores the identification information idr for identifying an executable version from the list. The verification information includes the identifier id of the version and the verification value H calculated based on the valid piece of software corresponding to the identifier id.

As described above, the banknote handling apparatus 1 stores the verification value H and the identifier id (version information) in a pair in the memory device 181. The banknote handling apparatus 1 stores the identifier id of the software that is allowed to be executed in the memory device 181 as the identification information idr. The memory device 181 has the tamper resistance. Thus, the banknote handling apparatus 1 can securely manage the information (the verification information V) for identifying the executable piece of software.

The identification information idr stored in the banknote handling apparatus 1 is an identifier of the software that is allowed to be executed. The banknote handling apparatus 1 executes a version of the software corresponding to the identification information idr. Therefore, the banknote handling apparatus 1 executes an appropriate version of software.

When the software is updated to a new version, the banknote handling apparatus 1 verifies whether the new version of the software is valid or not. The encryption key used for the verification is stored in the memory device 181 having the tamper resistance. Therefore, the banknote handling apparatus 1 can ensure the reliability of the verification.

At the update of the software, the new version of the software is loaded into an area different from an area where the current version of the software is loaded. The current version of the software is valid until the identification information is rewritten to indicate the identifier id of the new version of the software.

Therefore, even if the power of the main substrate 155 is cut off in the course of the update of the software or unauthorized intervention occurs during the update process, the current version of the software is executed. Specifically, in the banknote handling apparatus 1, the current version of the software is not replaced with unauthorized software. According to the present embodiment, the software can be securely updated in the banknote handling apparatus 1.

The validity of the security chip 180 is ensured by the first and second counters 182 and 183 in the banknote handling apparatus 1. Thus, the validity of the security management information in the security chip 180 is ensured. Also in this regard, the banknote handling apparatus 1 can ensure the reliability of the software.

The safe housing 13 houses the main substrate 155. Access to the main substrate 155 requires the unlocking of the electronic lock 133. This requirement blocks falsification of the contents of the security chip 180 and the contents of the memory device 171 through direct access to the main substrate 155. Also in this regard, the banknote handling apparatus 1 can ensure the reliability of the software.

Second Embodiment

Figure 6:
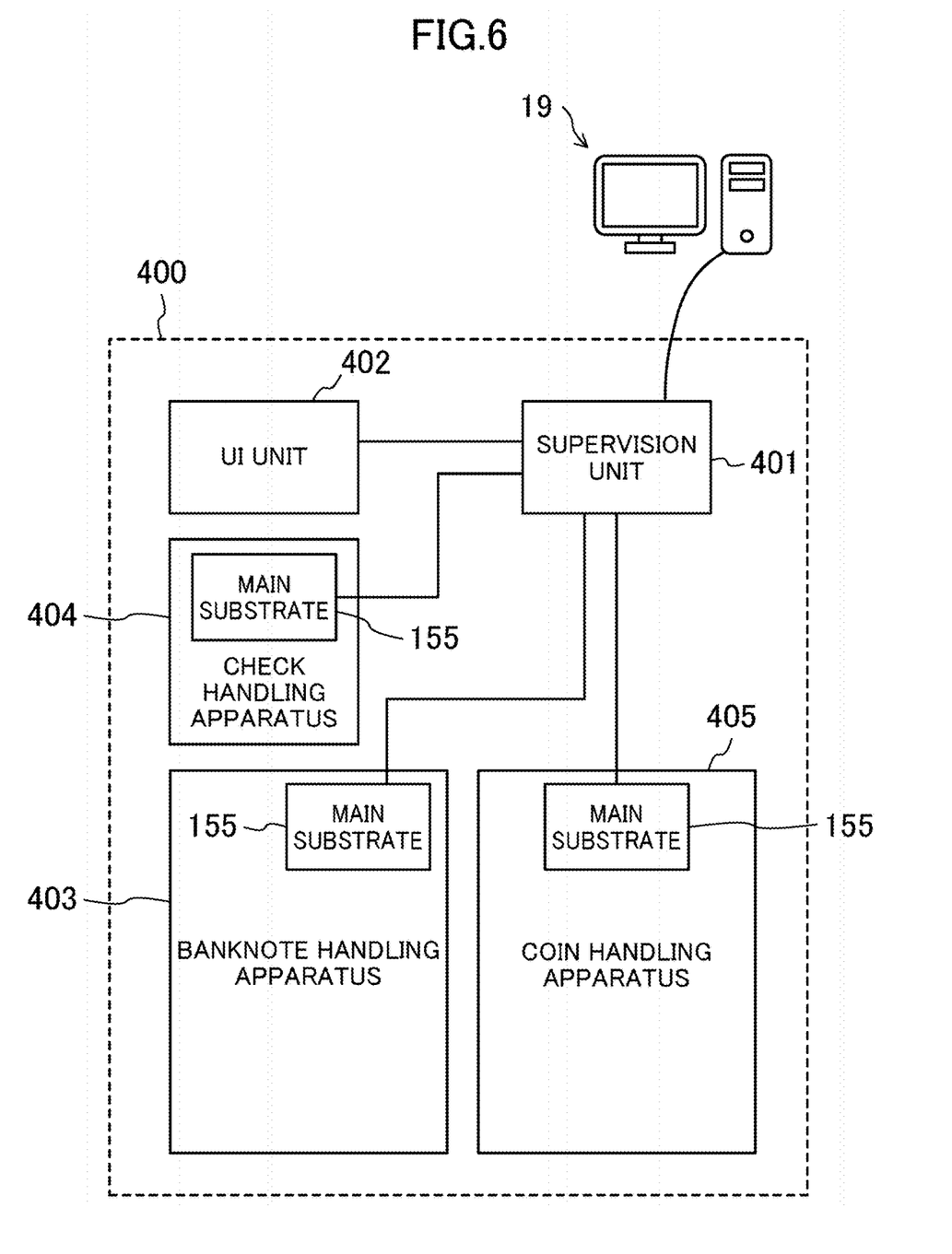
FIG. 6 is a block diagram illustrating a configuration of an automatic transition machine.

In a second embodiment, an automatic transition machine will be described as another embodiment of the medium handling apparatus. FIG. 6 is a block diagram illustrating a configuration of an automatic transition machine 400. The automatic transition machine 400 can handle various kinds of media which may be valuable. Specifically, the automatic transition machine 400 is capable of handling banknotes, checks, and coins. As shown in FIG. 6, the automatic transition machine 400 includes a supervision unit 401, a UI unit 402, a banknote handling apparatus 403, a check handling apparatus 404, and a coin handling apparatus 405. Automatic transition machine 400 may include, like controller 15 of banknote handline apparatus 1, processing circuitry. The processing circuitry may implement or encompass components of automatic transition machine 400.

The UI unit 402 includes an operator (such as a button and a touch panel). The user can give various instructions to the automatic transition machine 400 by operating the operator. The UI unit 402 is connected to the supervision unit 401. The UI unit 402 transmits instructions from the user to the supervision unit 401.

The banknote handling apparatus 403 is an apparatus that handles the banknotes, just like the banknote handling apparatus 1 (the first embodiment). The banknote handling apparatus 403 has hardware and software which are configured substantially in the same manner as those of the banknote handling apparatus 1. The banknote handling apparatus 403 includes a main substrate 155 similar to that of the first embodiment.

The banknote handling apparatus 403 does not have the UI unit 16 that has been included in the banknote handling apparatus 1. The banknote handling apparatus 403 receives the instruction of the user via the supervision unit 401, instead of the UI unit 16. The banknote handling apparatus 403 has a security management function similar to that of the banknote handling apparatus 1.

The check handling apparatus 404 is an apparatus that handles checks. The check handling apparatus 404 includes a main substrate 155 that is similar to that of the first embodiment. The main substrate 155 of the check handling apparatus 404 exerts the same security management function as that of the banknote handling apparatus 1.

The coin handling apparatus 405 is an apparatus that handles coins. The coin handling apparatus 405 includes a main substrate 155 similar to that of the first embodiment. The main substrate 155 of the coin handling apparatus 405 exerts the same security management function as that of the banknote handling apparatus 1.

The supervision unit 401 is realized by software, and a computer. The supervision unit 401 includes a main substrate 155 similar to that of the first embodiment. Specifically, the supervision unit 401 includes a security chip 180, a processor 170, a memory device 171, and a communication interface 172.

The processor 170 of the supervision unit 401 executes basic software (e.g., Linux (registered trademark)). The supervision unit 401 causes the security chip 180 and other components to function, and exerts a security management function similar to that of the banknote handling apparatus 1.

The communication interface 172 of the supervision unit 401 is connected to a server 19 via the Internet. The supervision unit 401 is connected to the UI unit 402, the banknote handling apparatus 403, the check handling apparatus 404, and the coin handling apparatus 405 via the communication interface 172. The supervision unit 401 controls the UI unit 402, the banknote handling apparatus 403, the check handling apparatus 404, and the coin handling apparatus 405 via the communication interface 172.

Security Management in Automatic Transition Machine (Operation Example)

Upon activation of the automatic transition machine 400, the supervision unit 401 performs an activation process. The activation of the supervision unit 401 is also performed under the same security management as that of the banknote handling apparatus 1 (the first embodiment). Specifically, the supervision unit 401 verifies whether the boot loader and the basic software are valid at the time of activation. Upon appropriate activation of the supervision unit 401, the supervision unit 401 gives a command to the banknote handling apparatus 403, the check handling apparatus 404, and the coin handling apparatus 405 to activate.

The activation of each of the banknote handling apparatus 403, the check handling apparatus 404, and the coin handling apparatus 405 is performed under the same security management as that of the banknote handling apparatus 1 (the first embodiment). Therefore, also in the second embodiment, security at the time of activation is ensured.

The server 19 notifies the supervision unit 401 of the update of various kinds of software. For example, suppose that the server 19 notifies the supervision unit 401 of the update of the software of the banknote handling apparatus 403, the supervision unit 401 transmits an update file to the banknote handling apparatus 403. Further, the supervision unit 401 commands the banknote handling apparatus 403 to update the software. Upon receiving the command for the software update, the banknote handling apparatus 403 updates the software by the same procedure as that performed by the banknote handling apparatus 1 (the first embodiment). Further, for example, the software update of the banknote handling apparatus 403 may be performed by connecting the maintenance terminal T2 of the first embodiment to the banknote handling apparatus 403 so that the notification is given from the maintenance terminal T2.

As described above, each of the supervision unit 401, the banknote handling apparatus 403, the check handling apparatus 404, and the coin handling apparatus 405 has the main substrate 155 similar to that of the banknote handling apparatus 1 (the first embodiment). Each of the supervision unit 401, the banknote handling apparatus 403, the check handling apparatus 404, and the coin handling apparatus 405 performs security management similar to that performed by the banknote handling apparatus 1 (the first embodiment). Therefore, the automatic transition machine 400 can also have the same advantages as those of the first embodiment.

Other Embodiments

The verification value H of the software may be a value obtained by summing up the hash value calculated directly from the software with a hash value (verification value H) of the other piece of software. This improves the reliability of the verification value H.

In order to calculate the summed value, the pieces of software may be sorted into a plurality of groups to perform the calculation on a group basis. For example, the basic software and the application software can be sorted into different groups. Calculating the hash value on the group basis facilitates the management of the summed value.

In data communication between the substrates, the function of the security chip 180 may be used to verify the validity of the data (verification of the hash value).

The encryption method used in the embodiments is an example. Other encryption systems may be adopted.

The technology disclosed herein is not limited to the application to the banknote handling apparatus 1 and the automatic transition machine 400 described above. The technology disclosed herein is applicable to a medium handling apparatus that handles checks, vouchers, stock certificates, and other valuable media. Further, the technology disclosed herein is also applicable to a money handling apparatus that handles media such as banknotes and coins.

An apparatus in accordance with the present application securely manages information for identifying an executable piece of software in a medium handling apparatus. The information (the verification information V) for identifying the executable piece of software is managed using the first memory device having the tamper resistance. The identification information may be an identifier of a piece of verification information of an executable piece of software. The medium handling apparatus further includes, a housing that houses the medium; and a substrate having the first memory device mounted thereon.

The housing houses the substrate, which has a first memory device mounted thereon and protected by the housing. The housing may be lockable, and the substrate may be installed in a place where access to the substrate requires unlocking of the housing. The substrate having the first memory device mounted thereon is protected at a high security level.

The pieces of software may include a boot loader that loads a different piece of software into the second memory device. The pieces of software may include a piece of software for handling a medium. The verification value is a hash value based on the piece of software.

The validity of the piece of software is verified by the hash value. The first memory device having the tamper resistance is used to manage the hash value. A hash value of a different piece of software is summed with a verification value of a predetermined piece of software. A hash value of a different piece of software is summed with the verification value. This summing improves the reliability of the verification value.

The pieces of software of a plurality of kinds are sorted into a plurality of groups, and summing with the hash value is performed on a group basis. The summing with the hash value is performed on a group basis. This group-based summing facilitates the management of the summed value. The pieces of software include an update application that updates a current version of a different piece of software to a new version, and the processor executes the update application to store a new version of the software in an area different from an area of the second memory device where a current version of the software is stored, add a piece of verification information of the new version of the software to the list, and rewrite the identification information to enable the new version of the software to be executed.

The new version of the software is stored in the area different from the area where the current version of the software is stored. The current version of the software is valid until the identification information is rewritten to indicate the identifier of the new version of the software. Therefore, even if the power is cut off in the course of the update of the software or unauthorized intervention occurs in the update process, the current version of the software is executed. Specifically, in this aspect, the current version of the software is not replaced with unauthorized software. In this aspect, the software can be securely updated.

An apparatus in accordance with the present application includes a recording medium that records management software for managing pieces of software for handling a medium. The management software causes the computer to perform: an operation of storing, in a first memory device having tamper resistance, pieces of verification information used for verification of validity of the pieces of software as a list which enables a search for the verification information by version of the software; and an operation of storing, in the first memory device, identification information for identifying a piece of verification information of an executable version of the software from the list, and each piece of verification information includes an identifier of the version and a verification value calculated based on a valid piece of software corresponding to the identifier.

The management software causes the computer to perform, an operation of storing a new version of the software in an area different from an area of the second memory device where a current version of the software is stored; an operation of adding a piece of verification information of the new version of the software to the list; and an operation of rewriting the identification information to enable the new version of the software to be executed.

A method for managing software for handling a medium in accordance with the present application includes: storing, in a first memory device having tamper resistance, pieces of verification information used for verification of validity of the software as a list which enables a search for the verification information by version of software; and storing, in the first memory device, identification information for identifying the verification information of an executable version of the software from the list. Each piece of verification information includes an identifier of the version and a verification value calculated based on valid software corresponding to the identifier. Storing a new version of the software in an area different from an area of the second memory device where a current version of the software is stored; adding a piece of verification information of the new version of the software to the list; and rewriting the identification information to enable the new version of the software to be executed. The medium handling apparatus can securely manage the information for identifying the executable piece of software.

What is claimed is:

1. A banknote handling apparatus that handles a banknote, the banknote handling apparatus comprising:
   a first memory device that is tamper resistant;
   a second memory device that stores a plurality of executable instructions which are different versions of each other;
   a processor configured to execute the plurality of executable instructions;
   a substrate on which the first memory device is mounted;
   a depositing unit that takes the banknote into the banknote handling apparatus;
   a transport unit including a transport path connected to the depositing unit, the transport unit transports the banknote;
   a recognition unit located on the transport path, the recognition unit detects the banknote transported by the transport unit; and
   a storage unit that is connected to the transport path, the storage unit stores the banknote after detection by the recognition unit, wherein
   the storage unit is disposed in a safe,
   the safe is lockable,
   the substrate is installed in the safe such that access to the substrate requires unlocking of the safe, and
   the first memory device includes:
      a first memory area that stores pieces of verification information, used for verification of validity of the plurality of executable instructions, as a list which enables a search for particular verification information, wherein each of the pieces of the verification information comprises (1) a verification value calculated based on one of the plurality of executable instructions and (2) an identifier corresponding to the verification value; and
      a second memory area that stores identification information for identifying a piece of verification information of an executable version of the plurality of executable instructions from the list, the executable version being a version which is permitted to be executed among the plurality of executable instructions.

2. The banknote handling apparatus of claim 1, wherein the identification information is the identifier.

3. The banknote handling apparatus of claim 1, wherein the plurality of executable instructions include a boot loader that loads a different executable instruction of the plurality of executable instructions into the second memory device.

4. The banknote handling apparatus of claim 1, wherein the plurality of executable instructions include a first executable instruction for handling the banknote.

5. The banknote handling apparatus of claim 1, wherein the verification value is a hash value based on the executable instruction.

6. The banknote handling apparatus of claim 5, wherein a hash value of a different executable instruction of the plurality of executable instructions is summed with a verification value of a predetermined executable instruction.

7. The banknote handling apparatus of claim 6, wherein the plurality of executable instructions are sorted into a plurality of groups, and
summing with the hash value is performed on a group basis.

8. The banknote handling apparatus of claim 1, wherein the plurality of executable instructions include an update application that updates a current version of a different executable instruction to a new version, and
the processor executes the update application to:
   store the new version of the executable instruction in an area different from an area of the second memory device where a current version of the executable instruction is stored,
   add a piece of verification information of the new version of the executable instruction to the list, and
   rewrite the identification information to enable the new version of the executable instruction to be executed.

* * * * *